US012740848B2

(12) United States Patent
Luo

(10) Patent No.: US 12,740,848 B2
(45) Date of Patent: Sep. 22, 2026

(54) DENTAL CROWN OF DENTAL IMPLANT AND DENTAL IMPLANT THEREOF

(71) Applicant: CHENGDU KANGMEISHENG MEDICAL TECHNOLOGY CO., LTD., Chengdu (CN)

(72) Inventor: Qiang Luo, Chengdu (CN)

(73) Assignee: CHENGDU KANGMEISHENG MEDICAL TECHNOLOGY CO., LTD., Chengdu (CN)

( * ) Notice: Subject to any disclaimer, the term of this patent is extended or adjusted under 35 U.S.C. 154(b) by 0 days.

(21) Appl. No.: 18/284,795

(22) PCT Filed: Apr. 14, 2023

(86) PCT No.: PCT/CN2023/088247
§ 371 (c)(1),
(2) Date: Sep. 28, 2023

(87) PCT Pub. No.: WO2023/216805
PCT Pub. Date: Nov. 16, 2023

(65) Prior Publication Data

US 2025/0072998 A1 Mar. 6, 2025

(30) Foreign Application Priority Data

May 10, 2022 (CN) ......................... 202221107948.3

(51) Int. Cl.
*A61C 5/70* (2017.01)

(52) U.S. Cl.
CPC ...................................... *A61C 5/70* (2017.02)

(58) Field of Classification Search
CPC .................................... A61C 5/70; A61C 5/77
See application file for complete search history.

(56) References Cited

U.S. PATENT DOCUMENTS 2,154,499 A * 4/1939 Eisenstein ................ A61C 5/73 433/219
4,778,386 A * 10/1988 Spiry ................ A61C 13/0001 433/45
5,082,445 A * 1/1992 Singer .................. A61C 8/0022 433/169

(Continued)

FOREIGN PATENT DOCUMENTS

CN 203943751 U 11/2014
CN 107126274 A 9/2017

(Continued)

OTHER PUBLICATIONS

PCT/CN2023/088247 Translation of International Search Report and Written Opinion of the International Searching Authority, dated Apr. 14, 2023, 5 pages in Chinese and 6 pages in English.

*Primary Examiner* — Ralph A Lewis
(74) *Attorney, Agent, or Firm* — Nolte Lackenbach Siegel

(57) ABSTRACT

Disclosed are a dental crown of a dental implant and a dental implant thereof. The dental crown of the dental implant includes a dental crown body. An occlusal side groove is reserved in the top of the dental crown body, an interocclusal space is reserved between a groove bottom adjacent wall of the occlusal side groove and an opposing tooth, the reserved occlusal side groove is used for the filling of photosensitive resin, and the photosensitive resin is used for making contact with the opposing tooth.

9 Claims, 2 Drawing Sheets

(56) References Cited

U.S. PATENT DOCUMENTS

| | | | | |
|---|---|---|---|---|
| 5,785,524 | A * | 7/1998 | Wolf | A61C 8/0068 433/172 |
| 6,068,481 | A * | 5/2000 | Worthington | A61C 5/77 433/218 |
| 11,540,903 | B2 * | 1/2023 | Pierson | A61C 5/60 |
| 2004/0096805 | A1 * | 5/2004 | Saito | A61C 5/20 433/218 |
| 2006/0252009 | A1 * | 11/2006 | Gogarnoiu | A61C 8/0075 433/173 |
| 2010/0119995 | A1 * | 5/2010 | Grant | A61C 8/005 433/201.1 |
| 2013/0177872 | A1 * | 7/2013 | Blaisdell | A61C 8/008 433/173 |
| 2015/0004563 | A1 * | 1/2015 | Blaisdell | A61C 8/0001 433/173 |
| 2016/0302743 | A1 * | 10/2016 | Casement | A61B 6/51 |
| 2023/0210632 | A1 * | 7/2023 | White | A61C 5/77 433/218 |
| 2025/0072998 | A1 * | 3/2025 | Luo | A61C 8/00 |

FOREIGN PATENT DOCUMENTS

| | | | |
|---|---|---|---|
| CN | 209790052 | U | 12/2019 |
| CN | 210749568 | U | 6/2020 |
| CN | 111772842 | A | 8/2020 |
| CN | 113842237 | A | 12/2021 |
| CN | 217118636 | U | 8/2022 |
| WO | 2020105813 | A1 | 5/2020 |

* cited by examiner

DENTAL CROWN OF DENTAL IMPLANT AND DENTAL IMPLANT THEREOF

CROSS-REFERENCE TO RELATED APPLICATION

This patent application is a national stage application of International Patent Application No. PCT/CN2023/088247, filed on Apr. 14, 2023, the disclosure of which is incorporated by reference herein in its entirety as part of the patent application and which further claims the benefit and priority of Chinese Patent Application No. 202221107948.3, filed with the China National Intellectual Property Administration on May 10, 2022.

FIGURE SELECTED FOR PUBLICATION

FIG. 2

TECHNICAL FIELD

The present disclosure relates to the field of clinical oral, in particular to a dental crown of a dental implant and a dental implant thereof.

BACKGROUND

Dental implant refers to a type of missing tooth restoration mode that is based on a substructure implanted into the bone tissue to support and retain an upper dental prosthesis, including two parts: a lower support implant, and an upper dental prothesis, and is mainly aimed at the treatment of tooth defects and loss. Dental prosthesis is generally simulated and manufactured according to existing real teeth, but due to the errors in manufacturing and installation, it is inevitable that there is the problem of improper installation. When the excessively high occlusion occurs, the load of the dental prothesis and opposing tooth is increased. At this time, it is necessary to grind the high point of all-ceramic tooth and redundant approximal surfaces that are in close contact with neighboring teeth, which increases extra time on the one hand, and has high technical requirements and requires experienced doctors to grasp the discretion on the other hand. Therefore, in the existing dental implant installation process, the overall restoration is time-consuming and laborious because of excessively high or too low occlusion recovery, leading to the increase of the number of visits of the patient.

For the published patent documents involving the improvement of dental crowns, for example, an adjustable artificial dental crown is disclosed in Chinese Patent with authorization publication No. CN107126274B. A side wall of the adjustable artificial dental crown is provided with an accommodating groove having an upper opening and a lateral opening. The upper opening is located at the top of the dental crown, the side opening is located at a side wall of the dental crown, the accommodating groove is internally provided with a detachable inlay or filled with a filling material. In accordance with the adjustable artificial dental crown of the scheme, the dental crown can be repaired without removing the original dental crown. However, the scheme can solve the problem of vertical food impaction caused by a gap generated between the approximal surfaces after the dental crown is worn for a period of time, but cannot solve the problems of horizontal impaction and excessively high or too low occlusion at the occlusal side during initial installation, and has no shock absorption and buffering functions.

For another example, a method for solving dental implant impaction is disclosed in the Chinese patent with application publication No. CN111772842A. According to this scheme, installation grooves are provided at the approximal surfaces on both side walls of a dental crown of a dental implant, and are filled resin. That is, the scheme is actually the same as the Chinese patent with authorization publication No. CN107126274B. By designing the installation grooves and resin on the approximal surfaces on both sides of the dental implant, a gap between the dental implant and the natural tooth can be effectively filled, thus effectively preventing the food impaction phenomenon at the dental implant due to the gap between the dental implant and the natural tooth after implantation. However, the problem that the dental implant needs grinding adjustment or restoration due to improper occlusion (e.g., excessively high occlusion and too low occlusion) at the occlusal side during the installation process of the dental implant cannot be solved, the problem of horizontal impaction also cannot be solved, and the scheme has no shock absorption and buffering functions.

Therefore, how to provide a dental implant, which can save time and effort when repaired due to improper occlusion during installation and after being worn for a period of time, is a technical problem to be solved urgently.

SUMMARY

An objective of the present disclosure is to provide a dental crown of a dental implant to solve the problems existing in the prior art. An occlusal side groove is provided on a top of a dental crown body, and an interocclusal space is formed between a groove bottom adjacent wall of the occlusal side groove and an opposing tooth, thus forming a space for accommodating photosensitive resin in the occlusal side groove. After the occlusal side groove is filled with the photosensitive resin, the photosensitive resin can be used to make contact with the opposing tooth to play a role in buffering and shock absorption, thus avoiding periodontal trauma or tooth fracture caused by direct hard contact between the dental crown body and the opposing tooth, and reducing central screw fracture and abutment fracture in the dental crown body. Meanwhile, the time for installing and grinding the tooth is shortened.

In order to achieve the above objective, the present disclosure provides the following solution:

A dental crown of a dental implant includes a dental crown body. An occlusal side groove is reserved in the top of the dental crown body, and an interocclusal space is reserved between a groove bottom adjacent wall of the occlusal side groove and an opposing tooth. The reserved occlusal side groove is used for the filling of photosensitive resin, and the photosensitive resin is used to make contact with the opposing tooth.

Preferably, an approximal groove is reserved in a side part, corresponding to a neighboring tooth, of the dental crown body, and an interproximal space is reserved between a groove bottom adjacent wall of the approximal groove and the neighboring tooth. The reserved approximal groove is used for the filling of photosensitive resin, and the photosensitive resin is used to restore a shape and make contact with the neighboring tooth.

Preferably, each of a mesial side and a distal side of the occlusal side groove is provided with the approximal groove.

Preferably, a mesial side of the occlusal side groove is provided with the approximal groove.

Preferably, each of the occlusal side groove and the approximal groove is provided with a trapezoidal structure or pin hole structure for preventing falling off.

Preferably, the occlusal side groove is internally provided with a screw hole, and a hole wall of the screw hole is provided with an annular boss extending towards a top direction.

Preferably, a gap of the interocclusal space is equal to or greater than 2 mm.

Preferably, a depth of the occlusal side groove is from 1 mm to 3 mm, a depth of the approximal groove in an occlusogingival direction is flush with or above gingiva, and a width of the groove bottom adjacent wall is from 0.5 mm to 2 mm.

A dental implant is also provided, which includes a dental base, and the dental crown of the dental implant as above, in which the dental crown of the dental implant is installed on the dental base.

Preferably, the dental base includes an implant and an abutment, the dental crown body is bonded to the abutment to form a complex, and the complex is installed on the implant by a central screw.

Compared with the Prior Art, the Present Disclosure has the Following Technical Effects:

(1) According to the present disclosure, an occlusal side groove is provided on a top of a dental crown body, and an interocclusal space is formed between a groove bottom adjacent wall of the occlusal side groove and an opposing tooth, thus forming a space for accommodating photosensitive resin in the occlusal side groove. After the occlusal side groove is filled with the photosensitive resin, the photosensitive resin can be used to make contact with the opposing tooth, compared with the traditional mode that the pure zirconia all-ceramic facet is in contact with the opposing tooth, the acting force is softer, the effects of buffering and shock absorption are achieved, periodontal trauma or tooth fracture caused by direct hard contact between the dental crown body and the opposing tooth can be reduced, and the central screw fracture and abutment fracture in the dental crown body can be reduced. Meanwhile, the time for installing and grinding the tooth is shortened.

(2) An approximal groove is provided on a side part, corresponding to a neighboring tooth, of the dental crown body, and an interproximal space is reserved between a groove bottom adjacent wall of the approximal groove and the neighboring tooth, thus forming a space for accommodating photosensitive resin. After the approximal groove is filled with the photosensitive resin, the photosensitive resin can be used to make contact with the neighboring tooth. If a gap appears between the neighboring tooth and the dental crown body of the dental implant due to the movement of the neighboring tooth, the photosensitive resin can be ground off and filled again by a similar filling method. By using such a mode, the gap can be immediately repaired without reworking or dismantling. Moreover, the photosensitive resin is used to make contact with the neighboring tooth, which is easier to grind compared with a porcelain material, and thus the grinding can be completed easily and efficiently.

(3) According to the present disclosure, the range of the interproximal space of the dental crown body is provided beyond an interproximal area, i.e., the groove bottom-gingival wall of the approximal groove extends beyond the interproximal area to a gingival side, is flush with or higher than the gingival side. The approximal groove is filled with photosensitive resin, and the photosensitive resin is used to restore the shape and make contact with the neighboring tooth, thus facilitating the repairing the interproximal area to prevent vertical impaction during occlusion, and preventing the problems of black triangle and horizontal impaction caused by large gingival gap due to large gingival undercuts in the interproximal area of the neighboring teeth.

(4) Each of the occlusal side groove and the approximal groove is provided with a trapezoidal structure for preventing falling off. After the photosensitive resin is filled, the trapezoidal structure can be used to improve the connection stability between the photosensitive resin and the dental crown body, thus effectively preventing the photosensitive resin from falling off.

(5) The occlusal side groove is internally provided with a screw hole, and a hole wall of the screw hole is provided an annular boss extending towards a top direction. After the photosensitive resin is filled, an anchoring structure for the photosensitive resin can be formed, which can effectively prevent the photosensitive resin from creeping, and further improving the connection stability between the photosensitive resin and the dental crown body.

BRIEF DESCRIPTION OF THE DRAWINGS

To describe the technical solutions in the embodiments of the present disclosure or in the prior art more clearly, the following briefly introduces the accompanying drawings required for describing the embodiments. Apparently, the accompanying drawings in the following description show merely some embodiments of the present disclosure, and those of ordinary skill in the art may still derive other drawings from these accompanying drawings without creative efforts.

Figures 1, 2:
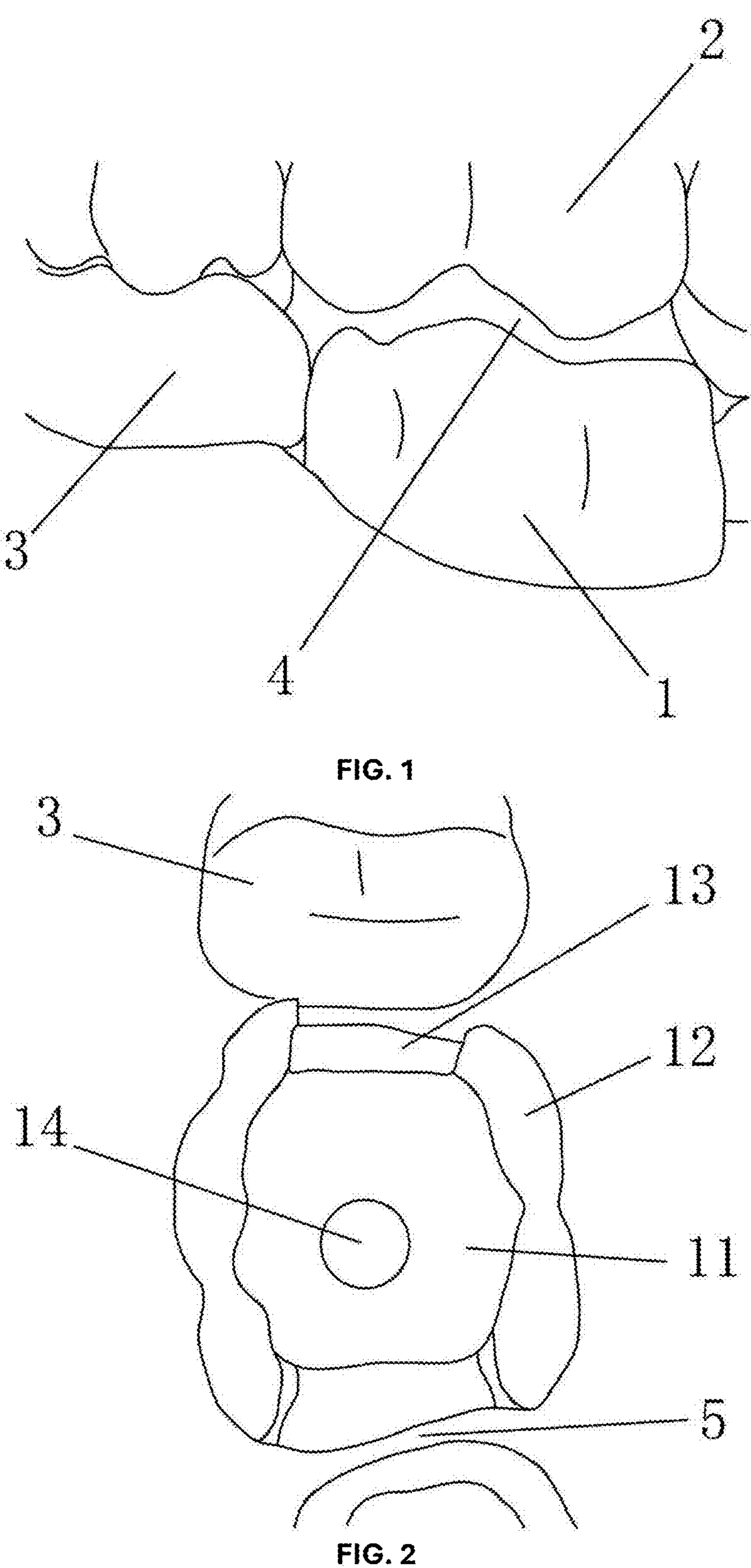
FIG. 1 is a schematic diagram of a front structure according to the present disclosure.
FIG. 2 is a structural schematic diagram of a dental crown body at a middle position in accordance with the present disclosure.
Figure 3:
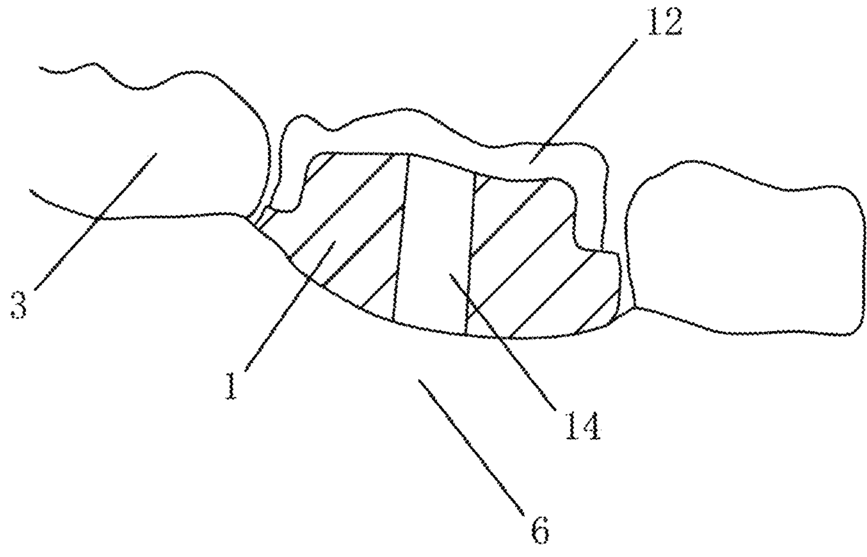
FIG. 3 is a schematic diagram of a sectional structure of a dental crown body in FIG. 2.

In the drawings: 1—dental crown body; 11—occlusal side groove; 12—groove bottom adjacent wall; 13—approximal groove; 14—screw hole; 141—hole wall; 2—opposing tooth; 3—neighboring tooth; 4—interocclusal space; 5—interproximal space; 6—dental base.

DETAILED DESCRIPTION OF THE EMBODIMENTS

The following clearly and completely describes the technical solutions in the embodiments of the present disclosure with reference to the accompanying drawings in the embodiments of the present disclosure. Apparently, the described embodiments are merely a part rather than all of the embodiments of the present disclosure. All other embodiments obtained by a person of ordinary skill in the art based on the embodiments of the present disclosure without creative efforts shall fall within the protection scope of the present disclosure.

An objective of the present disclosure is to provide a dental crown of a dental implant to solve the problems existing in the prior art. An occlusal side groove is provided on a top of a dental crown body, and an interocclusal space is formed between a groove bottom adjacent wall of the occlusal side groove and an opposing tooth, thus forming a space for accommodating photosensitive resin in the occlusal side groove. After the occlusal side groove is filled with the photosensitive resin, the photosensitive resin can be used to make contact with the opposing tooth to play a role in buffering and shock absorption, thus avoiding periodontal trauma or tooth fracture caused by direct hard contact between the dental crown body and the opposing tooth, and reducing central screw fracture and abutment fracture in the dental crown body. Meanwhile, the time for installing and grinding the tooth is shortened, the rework and porcelain addition are reduced, and the rework by breaking the crown is reduced.

To make the objectives, features and advantages of the present disclosure more apparently and understandably, the following further describes the present disclosure in detail with reference to the accompanying drawings and the specific embodiments.

As shown in FIG. 1 through FIG. 4, a dental crown of a dental implant is provided. A main shape of the dental crown of the dental implant is arranged according to a tooth at an implant position. After the final installation of the dental crown is completed, approximal surfaces of the dental crown are in contact with mesial and distal neighboring teeth 3, and a top surface (i.e., an occlusal side surface) of the dental crown is in contact with an opposing tooth 2 to play a chewing function of a normal tooth. One of the key points of the present disclosure is that, instead of making direct contact with the opposing tooth 2 or the neighboring tooth 3 with the dental crown body 1, the photosensitive resin filled in the dental crown body 1 is used to make contact with the opposing tooth 2 or the neighboring tooth 3. Specifically, the dental crown of the dental implant includes a dental crown body 1, an occlusal side groove 11 is formed in a top of the dental crown body 1 and has a certain depth, and the depth should ensure the strength of the subsequently filled photosensitive resin and the connection stability between the photosensitive resin and the dental crown body 1. An interocclusal space 4 is provided between a groove bottom adjacent wall 12 of the occlusal side groove 11 and the opposing tooth 2, that is, after making occlusal contact with other teeth, there is no contact between the dental crown body 1 at a dental implant position and the opposing tooth 2, and the gap is the interocclusal space 4, and a certain size is reserved for the interocclusal space 4. The occlusal side groove 11 is filled with the photosensitive resin, and the height of the photosensitive resin after filling is higher than the groove bottom adjacent wall 12 of the occlusal side groove 11, thus enabling the photosensitive resin to make contact with the opposing tooth 2 instead of enabling the groove bottom adjacent wall 12 of the dental crown body 1 to make contact with the opposing tooth 2. According to the present disclosure, an occlusal side groove 11 is provided on a top of the dental crown body 1, and an interocclusal space 4 is formed between a groove bottom adjacent wall 12 and the opposing tooth 2, thus forming a space for accommodating the photosensitive resin in the occlusal side groove 11. After the occlusal side groove 11 is filled with the photosensitive resin, the photosensitive resin can be used to make contact with the opposing tooth 2, compared with a traditional mode that a pure dental crown body 1 (e.g., zirconia all-ceramic facet) is in direct contact with the opposing tooth 2, the acting force is softer, the effects of buffering and shock absorption are achieved, and periodontal trauma or tooth fracture caused by direct hard contact between the dental crown body and the opposing tooth can be reduced. Meanwhile, the time for installing and grinding the tooth is shortened Further, an approximal groove 13 can be provided on a side part, corresponding to a mesial or distal neighboring tooth 3, of the dental crown body 1 and has a certain depth, and the depth should ensure the strength of the subsequently filled photosensitive resin and the connection stability between the photosensitive resin and the dental crown body 1. The approximal groove 13 may communicate with the occlusal side groove 11 or may be relatively independently provided. An interocclusal space 5 is provided between a groove bottom adjacent wall 12 of the approximal groove 13 and the neighboring tooth 3, that is, there is no contact between the dental crown body 1 at a dental implant position and the neighboring tooth 3, a gap between the dental crown body 1 at the dental implant position and the neighboring tooth 3 is an interproximal space 5, and a certain size is reserved for the interproximal space 5. The approximal groove 13 is filled with the photosensitive resin, and the height of the photosensitive resin after filling is higher than the groove bottom adjacent wall 12 of the approximal groove 13, thus enabling the photosensitive resin to make contact with the neighboring tooth 2. An approximal groove 13 is provided on a side part, corresponding to a neighboring tooth 3, of the dental crown body 1, and an interproximal space 5 is provided between a groove bottom adjacent wall 12 of the approximal groove 13 and the neighboring tooth 3, thus forming a space for accommodating the photosensitive resin in the approximal groove 13. After the approximal groove 13 is filled with the photosensitive resin, the photosensitive resin can be used to make contact with the neighboring tooth 3. If a gap appears between the neighboring tooth 3 and the dental crown body 1 of the dental implant due to the movement of the neighboring tooth 3, the photosensitive resin can be ground off and filled again by a similar filling method. By using such a mode, the gap can be immediately repaired without reworking or dismantling. Moreover, the photosensitive resin is used to make contact with the neighboring tooth 3, which is easier to grind, more flexibly to increase and reduce and repair compared with a porcelain material, and thus the grinding can be completed easily and efficiently. In addition, the range of the interproximal space 5 of the dental crown body 1 is provided beyond an interproximal area, i.e., a groove bottom-gingival wall of the approximal groove 13 extends beyond the interproximal area to a gingival side, is flush with or higher than the gingival side (e.g., 0.5 mm to 1.5 mm above the gingival, preferably 1 mm), and the approximal groove 13 is filled with the photosensitive resin. The photosensitive resin is used to restore a shape and make contact with the neighboring tooth 3, thus facilitating the repairing the interproximal area to prevent vertical impaction during occlusion, and preventing the problems of black triangle and horizontal impaction caused by large gingival gap due to large gingival undercuts in the interproximal area of the neighboring teeth 3.

As shown in FIG. 2, when the dental crown body 1 is located on a dental implant at a middle (non-distal, i.e., non-free) position, the approximal groove 13 may be provided on both a mesial side and a distal side of the occlusal side groove 11. Through the arrangement of the approximal grooves 13, the dental crown body 1 is not in direct contact with the neighboring tooth 3, and can be directly positioned without being affected by the neighboring tooth 3. Moreover, since the occlusal side groove 11 can be additionally provided, there is no direct contact between the occlusal side groove 11 and the opposing tooth 2, that is, there is no occlusal contact, and thus there is no high point and no need to adjust and grind for occlusion. The occlusal side groove 11 can communicate with the approximal grooves 13 on both sides to form an inverted U-shaped structure, and the filled photosensitive resin can make contact with both an inner wall of the occlusal side groove 11 and an inner wall of the approximal groove 13, thereby improving the connection stability between the photosensitive resin and the dental crown body 1.

Figure 4:
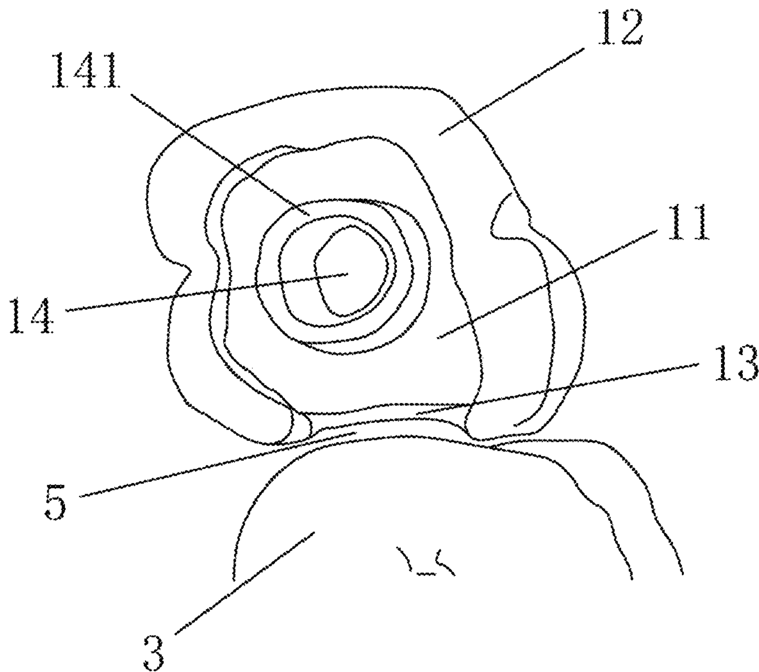
FIG. 4 is a structural schematic diagram of a dental crown body at an edge position in accordance with the present disclosure.

As shown in FIG. 4, when the dental crown body 1 is located on a dental implant at an edge position, the approximal groove 13 may be provided only on a mesial side of the occlusal side groove 11. The occlusal side groove 11 and the approximal groove 13 on one side of the occlusal side groove 11 may communicate with each other to form an inverted L-shaped structure. In this case, the filled photosensitive resin may also make contact with both an inner wall of the occlusal side groove 11 and an inner wall of the approximal groove 13, thereby improving the connection stability between the photosensitive resin and the dental crown body 1.

Each of the occlusal side groove 11 and the approximal groove 13 can be provided with a trapezoidal structure for preventing falling off. A wider end of the trapezoidal structure is located on a bottom side of the occlusal side groove 11 or the approximal groove 13, and a narrower end of the trapezoidal structure is located on one side far away from the bottom, thereby forming a reverse drawing structure, which makes the filled photosensitive resin not easy to fall off.

The occlusal side groove 11 is internally provided with a screw hole 14, and the screw hole 14 is used for a central screw to penetrate and fix, thus retaining the dental crown body 1. A hole wall 141 of the screw hole 14 is provided an annular boss extending towards a top direction. After the occlusal side groove 11 is filled with the photosensitive resin, the photosensitive resin can wrap the annular boss inside, thus forming an anchoring structure for the photosensitive resin, which can effectively prevent the photosensitive resin from creeping, and further improving the connection stability between the photosensitive resin and the dental crown body 1.

A gap of the interocclusal space 4 between the dental crown body 1 and the opposing tooth 2 can be reserved as 2 mm or more. After the occlusal side groove 11 is filled with the photosensitive resin, part of the photosensitive resin may fill the interocclusal space 4, and finally, the photosensitive resin of the dental crown body 1 is enabled to make contact with the opposing tooth 2. By providing the interocclusal space 4 of 2 mm, there is no direct occlusal contact between the dental crown body 1 and the opposing tooth 2, and the later restoration can be achieved by only using the photosensitive resin.

An occlusogingival depth of the occlusal side groove 11 may be from 1 mm to 3 mm, preferably about 2 mm. An occlusogingival depth of the approximal groove 13 may be flush with or higher than the gingiva (for example, about 1 mm above the gingiva), a width of the approximal groove 13 may be about 2 mm, and a width of the groove bottom adjacent wall 12 may be from 0.5 mm to 2 mm, preferably from 1 mm to 2 mm. Generally speaking, a thickness of existing zirconium porcelain is required to be at least 0.8 mm to resist a conventional occlusal force, and a width of the groove bottom adjacent wall 12 has exceeded this thickness (0.8 mm) when it is from 1 mm to 2 mm. Therefore, the existing zirconium porcelain can completely resist the conventional occlusal force in terms of strength and can satisfy normal use requirements.

A dental implant is also provided, including a dental base 6 and the dental crown of the dental implant which is installed on the dental base 6 and described as above.

The dental crown body 1 of the dental crown of the dental implant is provided with an occlusal side groove 11, and the occlusal side groove 11 is internally provided with a screw hole 14. The dental crown body 1 can be retained on the dental base 6 by installing a central screw in the screw hole 14. It should be noted that the dental base 6 includes an implant installed on alveolar bone, and also includes an abutment for connecting the implant and the dental crown body 1. During installation, the dental crown body 1 is bonded on the abutment to form a complex of the dental crown body 1 and the abutment, and then the complex is installed on the implant by a central screw.

Several examples are used for illustration of the principles and implementation methods of the present disclosure. The description of the embodiments is merely used to help illustrate the method and its core principles of the present disclosure. In addition, those of ordinary skill in the art can make various modifications in terms of specific embodiments and scope of application in accordance with the teachings of the present disclosure. In conclusion, the content of this specification shall not be construed as a limitation to the present disclosure.

What is claimed is:

1. A dental crown of a dental implant, comprising:

a dental crown body;

an occlusal side groove is reserved in a top surface at an end of the dental crown body distal from a gingiva, wherein the occlusal groove is configured to receive filling of photosensitive resin, and the photosensitive resin is configured to contact an opposing tooth;

an interocclusal space is reserved between a groove bottom adjacent wall of the occlusal side groove and the opposing tooth when upper and lower jaws are in occlusion;

wherein an approximal groove is reserved in a portion, corresponding to a neighboring tooth, of an outer surface of the dental crown body;

and an interproximal space is reserved between a groove bottom adjacent wall of the approximal groove and the neighboring tooth, and the reserved approximal groove is used for the filling of photosensitive resin, and the photosensitive resin is used to restore a shape and make contact with the neighboring tooth;

wherein each of a mesial side and a distal side of the occlusal side groove is provided with the approximal groove;

wherein each of the occlusal side groove and the approximal groove is configured with a trapezoidal structure with a groove width at a portion proximal to the gingiva is greater than a groove width at a portion distal from the gingiva;

the trapezoidal structure is configured to prevent falling of the photosensitive resin;

wherein a screw hole is formed on the occlusal side groove; and an annular boss is formed on the occlusal side groove by extension of a hole wall of the screw hole toward the top surface.

2. The dental crown of a dental implant according to claim 1, wherein a gap of the interocclusal space is equal to or greater than 2 mm.

3. The dental crown of a dental implant according to claim 1, wherein a depth of the occlusal side groove is from 1 mm to 3 mm, a depth of the approximal groove in an occluso-gingival direction is flush with or above gingiva, and a width of the groove bottom adjacent wall is from 0.5 mm to 2 mm.

4. A dental implant, comprising a dental base, and the dental crown of the dental implant according to claim 1, wherein:

the dental crown of the dental implant is installed on the dental base.

5. The dental implant according to claim 4, wherein a gap of the interocclusal space is equal to or greater than 2 mm.

6. The dental implant according to claim 4, wherein the dental base includes an implant and an abutment, the dental crown body is bonded to the abutment to form a complex, and the complex is installed on the implant by a central screw.

7. A dental crown of a dental implant, comprising:

a dental crown body;

an occlusal side groove is reserved in a top surface at an end of the dental crown body distal from a gingiva, wherein the occlusal groove is configured to receive filling of photosensitive resin, and the photosensitive resin is configured to contact an opposing tooth;

an interocclusal space is reserved between a groove bottom adjacent wall of the occlusal side groove and the opposing tooth when upper and lower jaws are in occlusion;

wherein an approximal groove is reserved in a portion, corresponding to a neighboring tooth, of an outer surface of the dental crown body;

an interproximal space is reserved between a groove bottom adjacent wall of the approximal groove and the neighboring tooth, and the reserved approximal groove is used for the filling of photosensitive resin, and the photosensitive resin is used to restore a shape and make contact with the neighboring tooth;

wherein a mesial side of the occlusal side groove is provided with the approximal groove;

wherein each of the occlusal side groove and the approximal groove is configured with a trapezoidal structure with a groove width at a portion proximal to the gingiva is greater than a groove width portion distal from the gingiva;

the trapezoidal structure is configured to prevent falling of the photosensitive resin;

a screw hole is formed on the occlusal side groove, and an annular boss is formed on the occlusal side groove by extension of a hole wall of the screw hole toward the top surface.

8. The dental crown of a dental implant according to claim 7, wherein a gap of the interocclusal space is equal to or greater than 2 mm.

9. The dental crown of a dental implant according to claim 7, wherein a depth of the occlusal side groove is from 1 mm to 3 mm, a depth of the approximal groove in an occluso-gingival direction is flush with or above gingiva, and a width of the groove bottom adjacent wall is from 0.5 mm to 2 mm.

* * * * *